(12) United States Patent
Munezane (10) Patent No.: US 7,058,458 B2
(45) Date of Patent: Jun. 6, 2006

(54) POWER CONTROLLER

(75) Inventor: Toshikazu Munezane, Suita (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 448 days.

(21) Appl. No.: 10/296,398

(22) PCT Filed: Mar. 22, 2002

(86) PCT No.: PCT/JP02/02827

§ 371 (c)(1),
(2), (4) Date: Mar. 4, 2003

(87) PCT Pub. No.: WO02/78266

PCT Pub. Date: Mar. 10, 2002

(65) Prior Publication Data

US 2003/0149492 A1    Aug. 7, 2003

(30) Foreign Application Priority Data

Mar. 26, 2001    (JP)    ................................ 200187481

(51) Int. Cl.
*G05B 11/01*    (2006.01)
(52) U.S. Cl. ..................... 700/12; 700/22; 700/110; 700/286; 700/297; 714/21; 714/22; 323/350
(58) Field of Classification Search ................ 700/12, 700/22, 110, 286, 297; 714/21, 22; 323/350, 323/351, 319
See application file for complete search history.

(56) References Cited

U.S. PATENT DOCUMENTS 4,174,496 A * 11/1979 McFall et al. ............... 323/235
4,495,568 A * 1/1985 Gilbert et al. ................. 714/22
5,784,628 A   7/1998 Reneris
6,535,110 B1* 3/2003 Arora et al. ........... 340/310.01
6,574,234 B1* 6/2003 Myer et al. .................. 370/462
6,725,281 B1* 4/2004 Zintel et al. ................. 719/318
6,789,208 B1* 9/2004 Noda et al. .................. 713/323
2004/0039949 A1   2/2004 Vollmer et al.

FOREIGN PATENT DOCUMENTS

| JP | 8-8937 A | 1/1996 |
|---|---|---|
| JP | 10-233791 A | 9/1998 |
| JP | 11-113192 A | 4/1999 |
| JP | 2000-358049 A | 12/2000 |
| WO | WO 02 32048 A | 4/2002 |

OTHER PUBLICATIONS

"The Havi Specifications" www-wv.informatik.uni-er.pdf, Nov. 19, 1998, pp. 124-139.

\* cited by examiner

*Primary Examiner*—Anthony Knight
*Assistant Examiner*—Thomas Pham
(74) *Attorney, Agent, or Firm*—Smith Patent Office (57) ABSTRACT

A command transmission/reception section (4R), a power-control determination section (8) and a power control section (9) are provided in a controlled device (3) which is connected to a network (1) and which performs power control in response to a command transmitted from a control device (2). Upon receipt of a power control command from the control device (2), the power-control determination section (8) determines as to power-on/power-off in units of a block, and performs power control on the basis of a result of the determination. Consequently, unnecessary power-on in, for example, video reservation can be prevented.

18 Claims, 9 Drawing Sheets

| 21 | 22 |
|---|---|
| UNIT | 0 |
| TUNER | 1 |
| MONITOR | 0 |

| IDENTIFIER DESCRIPTION FIELD 23 | DEVICE TYPE FIELD 24 | FUNCTION CONSTITUTION DESCRIPTION FIELD 25 | | NON-CONDITIONAL CONTROL 26 | CONDITIONAL CONTROL 27 |
|---|---|---|---|---|---|
| 001 | TUNER | TUNER | | | ○ |
| 002 | TUNER | TUNER | BB | | ○ |
| 003 | TV | TUNER | MONITOR | | ○ |
| 004 | TV | TUNER | MONITOR | BB | ○ |
| 005 | DVHS | VCR | | | ○ |
| 006 | DVHS | VCR | BB | | ○ |
| 007 | DVC | VCR | CAMERA | ○ | |
| 008 | DV | VCR | | | ○ |
| 009 | AMP | AUDIO | | ○ | |
| 010 | DVD PLAYER | DISC | | ○ | |
| 011 | DVD RECORDER | DISC | BB | | ○ |
| 012 | PC | | | | ○ |
| 013 | UNIDENTIFIED DEVICE | | | | ○ |

| DEVICE | USER OPERATION STATE | | | |
|---|---|---|---|---|
| DVHS | PLAYBACK | FAST PLAYBACK | REWIND PLAYBACK | FF | REW |
| DVD RECORDER | PLAYBACK | FAST PLAYBACK | REWIND PLAYBACK | | |
| TV | MONITOR POWER ON | | | | |

POWER CONTROLLER

BACKGROUND OF THE INVENTION

1. Field of the Invention

The present invention relates to a power controller for executing internal power-on/power-off in response to a power control command received from another device in an audio/video device connected via a digital network according to IEEE 1394 or the like.

2. Discussion of the Related Art

In most cases of conventional televisions (hereinafter, referred to as "TV") or the like, a power operation is performed from the outside of a TV main body; that is, power-on of a TV main body is performed by using a remote controller. The TV main body is powered on when a power-on command is received via a remote control signal in a standby state. Power-on is performed apparently in the presence of a user in the vicinity of the TV.

For the IEEE 1394 network, control commands of audio/video devices are standardized by an industrial standardization association. Mounting of a device-control-command processing program according to the standards enables the operation of audio/video devices including a TV, DVD player and VTR via a network. Power control commands (instructions) are prescribed in the standards. Using the commands enables the power-on/power-off of the device to be performed from an external device connected to the network. In addition, the power source of the audio/video device can be controlled from a personal computer in which software for transmitting the power control commands is installed.

In a VTR in which a video record reservation is set, on reaching reserved time, a primary power source is turned on from a standby state, and the power source state of a TV is checked. As a result of the checking, if the power source is in an off state, a power control command is issued to power on of the TV, and video recording is then started. In this case, if the video recording is reserved for a broadcast, a CRT of the TV need not be activated to illuminate; and it is preferable that only a tuner portion is powered on. However, when the VTR has transmitted a command to power on the overall device of the TV, a monitor portion including the CRT and a video output circuit is unexpectedly driven to operate. Driving the CRT to illuminate in the absence of the TV user is not preferable for the TV. This also produces disadvantages not only in safety but also in power saving.

Generally, while an audio/video device is configured of a plurality of functional blocks, functional blocks for performing power-on with a power control command are specified depending on controlled devices. As such, unnecessary power-on can take place for functional blocks which are unwanted to power on when, for example, a user is not in presence, and for either a TV display portion or monitor portion not viewed by a user.

SUMMARY OF THE INVENTION

The present invention is proposed in view of the conventional problems described above, and an object thereof is to enable a power control command to be discretely outputted for a functional block from one device (referred to as "control device") to another device (referred to as "controlled device") among a plurality of devices connected via a network. Another object of the present invention is to realize a power controller which enables power-on/power-off to be performed corresponding to, for example, the type and the operational state of the controlled device, so that power saving can be implemented.

A power controller of the present invention is a power controller for performing power control of an own local device including at least one functional block in accordance with a power control command transmitted from an external device connected to a network, the power controller including: a command transmitting/receiving section which receives the power control command from the external device and which transmits a response of the own local device; a power control section which performs power-on/power-off of the own local device at least in units of a block; and a power-control determination section which performs a determination as to power-on/power-off of each block on the basis of a power control command supplied via the command transmitting/receiving section and which outputs a result of the determination to the power control section.

In addition, a power controller according to the present invention further includes: a determination-information recording section which, in units of a functional block of the own local device, preliminarily stores determination information used to perform a determination as to whether to validate or invalidate a power control command transmitted from the external device, wherein the power-control determination section performs a determination as to whether to validate or invalidate execution of the power control command on the basis of information in the determination-information recording section upon receipt of the power control command from the external device, performs a determination as to individual-block power-on/power-off only for a valid block on the basis of the power control command, and outputs a result of the determination to the power control section.

Further, a power controller according to the present invention, further includes: a determination-information recording section which preliminarily stores determination information used to perform a determination as to whether to validate or invalidate a power control command transmitted from the external device, in units of the functional block of the own local device; and an external-device identifying section which identifies at least one of a type and a function of the external device connected to the network, wherein upon receipt of the power control command from the external device, the power-control determination section performs a determination as to whether to validate or invalidate execution of the power control command on the basis of information in the determination-information recording section, identifies whether or not the device has involved an operation from a user in accordance with information of at least one of the type and the function which has been identified by the external-device identifying section, outputs the power control command received from the outside to the power control section when having determined the device to have involved an operation performed from the user, and outputs a power control signal received from the outside to the power control section on the basis of a result of the determination in the other case.

DETAILED DESCRIPTION OF THE PREFERRED EMBODIMENT

Figure 1:
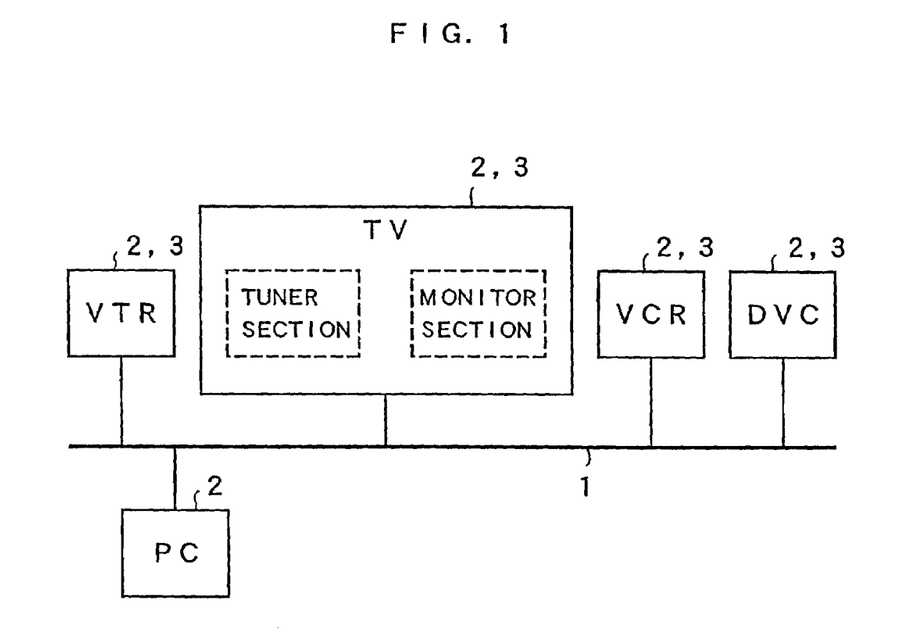
FIG. 1 is a system configuration view showing a system in which a plurality of audio/video devices is connected to a network.

FIG. 1 shows an example in which a plurality of audio/video devices connected to a network (bus connection network) 1. In this case, a VTR, TV, VCR, DVC and PC are assumed to be connected to the network 1. When each of these devices operates as one of these modes; namely it operates as a control device 2, as a controlled device 3 or as a device having these both functions. The PC stands for a personal computer and works as a control device 2. The VTR stands for a video tape recorder, the TV stands for a television and includes a tuner section and a monitor section with a CRT, the VCR stands for a video camera recorder, and the DVC stands for a digital video camera. Each of these devices is assumed to include the two functions of the control device 2 and the controlled device 3.

In case an audio/video device has the function of the controlled device to perform power control, even when a user is not present for reserved operation, the controlled device can be powered on with a power-on command being transmitted via the network. The overall configuration is common to each embodiment. Hereinafter, each of the embodiments will be described.

(Embodiment 1)

Figure 2:
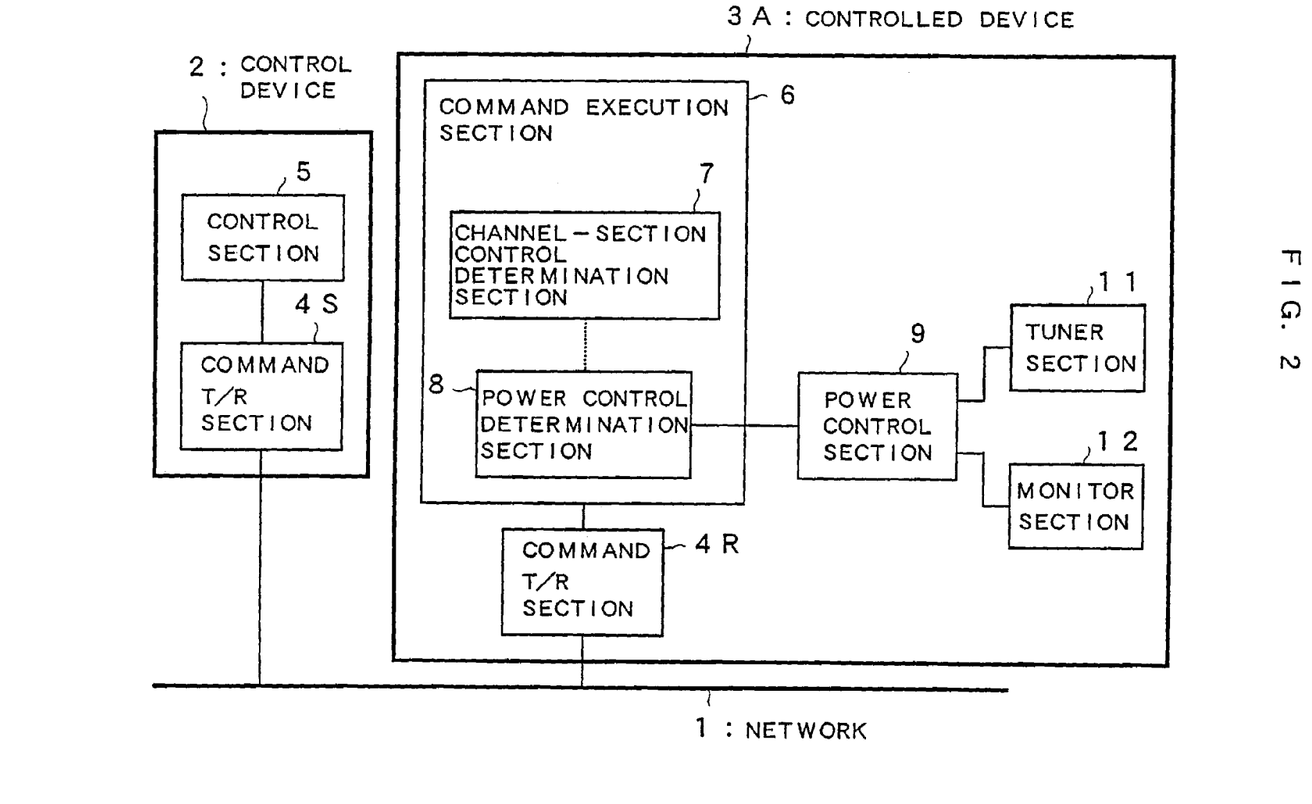
FIG. 2 is a system configuration view of a controlled device, and a control device including a power controller according to embodiment 1 of the present invention.

FIG. 2 is a block diagram showing basic connection relationships among individual devices including a power controller according to embodiment 1. As shown in FIG. 2, at least one pair of a control device 2 and a controlled device 3A is connected via a network 1. The pair of the control device 2 and the controlled device 3A is, for example, a home-use audio/video device. While having the same configuration, the controlling side is referred to as the control device 2, and the controlled side is referred to as the controlled device 3A. The control device 2 is assumed to have a function of transmitting control commands used to operate the other device, and the controlled device 3 is assumed to have a function of executing the transmitted control commands.

The control device 2 is configured to include a command transmission/reception (T/R) section 4S and a control section 5. The control section 5 issues a power-on control command to the controlled device 3A, and interprets the contents of a response returned from the controlled device 3A. The command transmission/reception section 4S performs operations, such as transmission of a control command which has been outputted from the control section 5 via the network 1, and reception of a response which has been outputted from the controlled device 3A.

The controlled device 3A is configured to include a command transmission/reception section 4R, a command execution section 6, a power control section 9, and blocks of its own. Each of the power controllers of the embodiments is assumed to include at least the command transmission/reception section 4R, a power-control determination section 8, and the power control section 9.

The command execution section 6 receives a control command from the control device 2 via the command transmission/reception section 4R, determines the type of the command, and processes the command. With a TV used for the controlled device 3A, the command execution section 6 is configured of blocks of, for example, a channel-selection control determination section 7 for selecting a broadcast channel, and a power-control determination section 8 for determining, for example, power-on/power-off. The command execution section described above is different depending on the function of a device.

The power-control determination section 8 determines as to the power-on/power-off of each of the blocks in response to a power control command fed via the command transmission/reception section 4R, and sends the determination result as an output to the power control section 9. The power control section 9 performs power-on/power-off of its own at least in units of the block. With a TV used for the controlled device 3A, a tuner section 11 and a monitor section 12 are additionally provided.

Hereinafter, basic operations of the power control in the controlled device 3A will be described. The control device 2 commands the controlled device 3A to perform, for example, power-on/power-off. For details, the control section 5 generates a power-on command according to a command transmission format, and sends the command to the network 1 via the command transmission/reception section 4S.

Subsequently, the controlled device 3A receives a control command addressed to itself via the command transmission/reception section 4R, and uses the command execution section 6 to interpret the control command. Upon having determined the command as a power control command according to a command format thereof, the controlled device 3A passes processing to the power-control determination section 8. The power-control determination section 8 determines that the command is to perform power-on/power-off for which one of the blocks in the controlled device 3A. Then, a command (power control command) for performing power-on/power-off for a corresponding block is outputted to the power control section 9. In this case, since the TV is used for the controlled device 3A, the power control section 9 is assumed to control the power source of the tuner section 11 independently of the power source of the monitor section 12. After the power control section 9 has performed the power-on/power-off of the predetermined block, the power-control determination section 8 generates the result according to a response format and then transmits the result to the control device 2 via the command transmission/reception section 4R.

In the control device 2, the command transmission/reception section 4S receives a response from the controlled device 3A and posts a notification thereof to the control section 5. In this manner, the control device 2 can recognize completion of the power-on/power-off of the controlled device 3A. Using the control method enables power control for another device to be implemented from a specific device connected to the network 1. Command formats for, for example, IEEE 1394 power control, are disclosed in detail in the document of "1394 Trade Association" entitled "AC/C Digital Interface Command Set General Specification (Version 3.0)" issued by the industrial standardization association.

(Embodiment 2)

Figure 3:
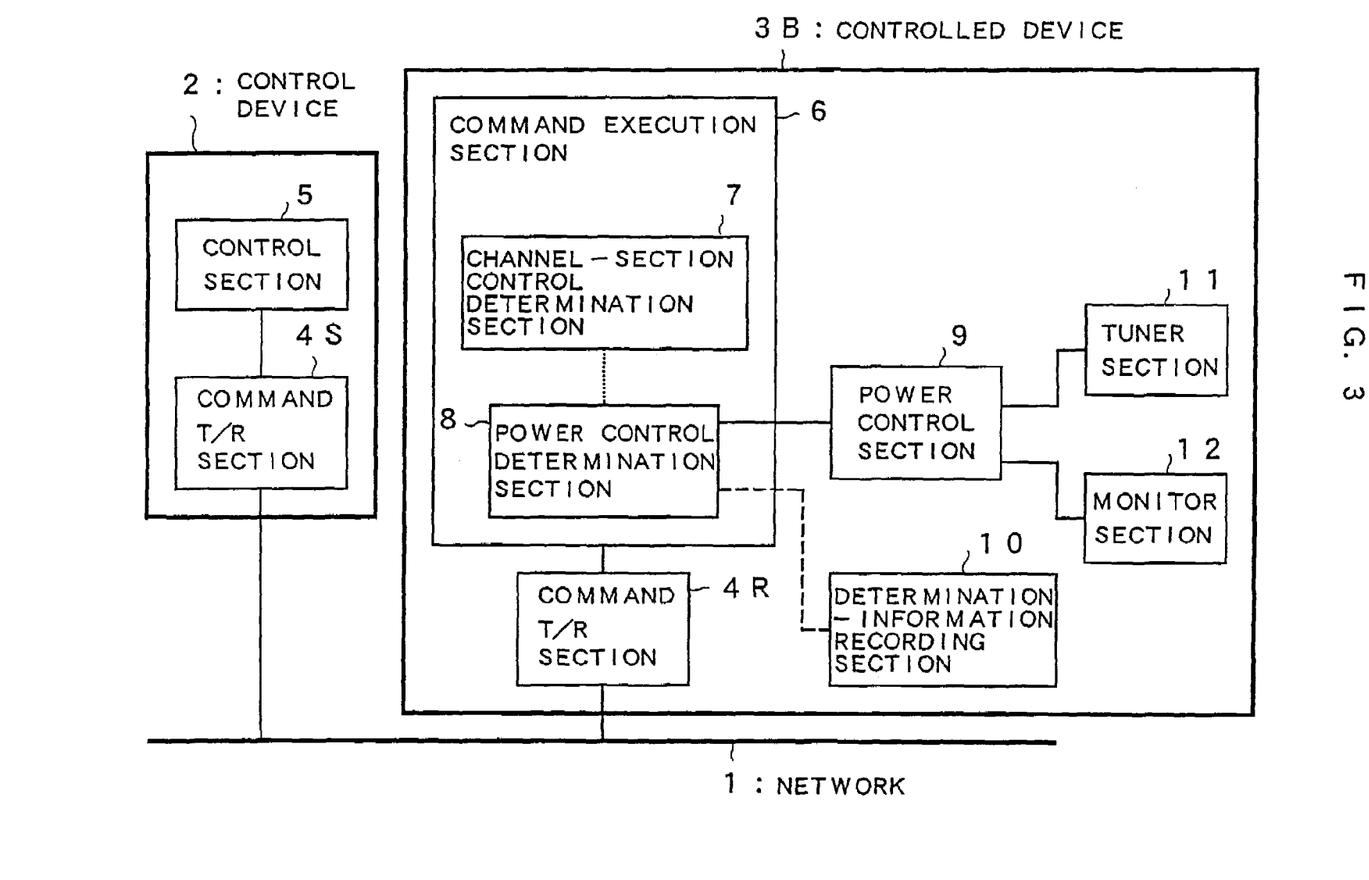
FIG. 3 is a system configuration view of a controlled device, and a control device including a power controller in embodiment 2 of the present invention.

Hereinafter, a power controller according to embodiment 2 of the present invention will be described. FIG. 3 is a configuration view showing basic connection relationships among individual devices including a power controller according to embodiment 2. The same reference numerals are assigned to the same portions as those in embodiment 1, and the description thereof will be omitted. A controlled device 3B is configured to include a determination-information recording section 10 in addition to the command transmission/reception section 4R, the command section 6 including the channel-selection control determination section 7 and the power-control determination section 8, and the power control section 9. With a TV used for the controlled device 3B, the tuner section 11 and the monitor section 12 are provided.

The determination-information recording section 10 is formed of a nonvolatile memory such as an EEPROM, and preserves flag information provided to, for example, enable a command execution or disable the command execution upon receipt of a power control command. For example, when a power control command has been issued from an external device, the flag is set to "0" not to execute the command, whereas the flag is set to "1" to enable the command execution. The power-control determination section 8 preliminarily reads out the flag information from the determination-information recording section 10. Then, upon receipt of the power control command from the control device 2, the power-control determination section 8 determines whether to execute the command in accordance with the flag information, and feeds the power control command to the power control section 9.

In addition, it is assumed that when power-on/power-off is individually performed in each block of the controlled device 3B, flag information in units of each block is set in the determination-information recording section 10. For example, as in a TV, blocks as a tuner section 11 for selecting broadcast channels and a monitor section 12 for displaying video are individually provided, and power control is performed in units of the block. In this case, power-on/power-off of each of the blocks can be discretely implemented in accordance with the power control command received from the external control device 2.

Figure 4:
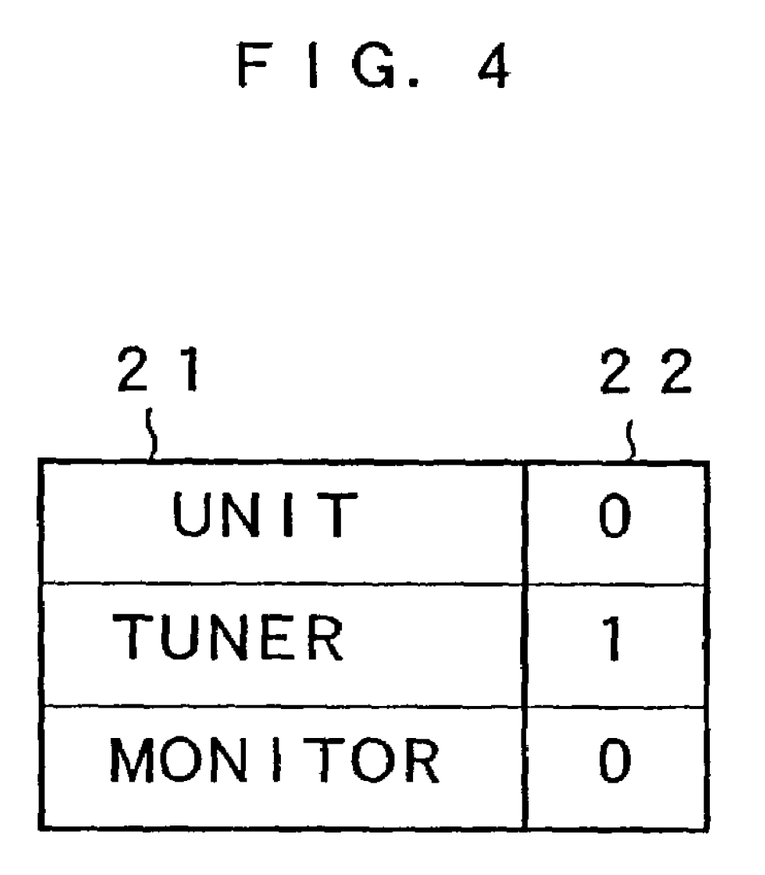
FIG. 4 is an explanatory view showing information preserved in an information recording section in the power controller in embodiment 2.

FIG. 4 shows example flag information which is recorded in the determination-information recording section 10 of the present embodiment. Referring to the figure, numeral 21 denotes block identification information, and numeral 22 denotes flag information. In the example configuration, the controlled device 3B is a TV in which a tuner section has a decoder for a communications satellite or broadcast satellite. The block identification units are, for example, set as a total device (UNIT), a tuner section (TUNER) and a monitor section (MONITOR). The flags are assumed to represent validity/invalidity of power control for each of the identification units such that the invalidity is set to "0", and the validity is set to "1". The block identification information 21 may be set using a unique number for identification among the devices instead of using the character string.

In the controlled device, when the flag for the device totality (UNIT) is "1" the flag value for each block need not be checked, and processing is set such that power control is accepted for all the blocks. On the other hand, processing is set such that when the flag for device totality (UNIT) is "0", the flag of each of the blocks belonging to a class lower than it is checked; when the flag is "1", power control is performed for the block; and when the flag is "0", power control is not performed.

Figure 5:
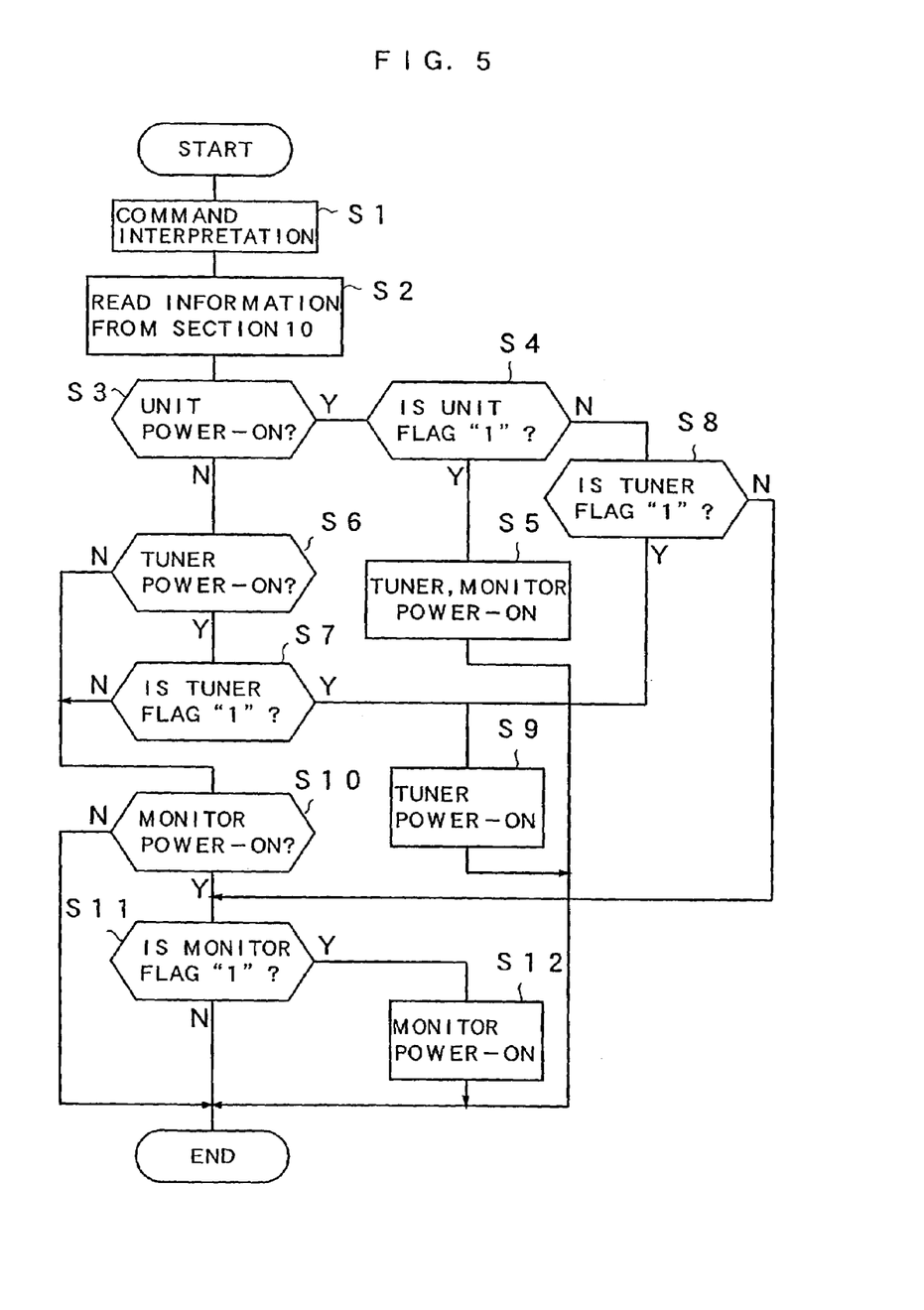
FIG. 5 is a flowchart showing an example procedure of power-on in accordance with determination information in the power controller according to embodiment 2.

FIG. 5 is a flowchart showing example power-on processing in a configuration of using a TV as the controlled device 3B. At step S1, upon receipt of a power-on control command in the controlled device 3B from the control device 2, the command execution section 6 starts interpretation of the command. Then, at step S2, information is read out of the determination-information recording section 10. Subsequently, if the command is identified for the unit power-on, the operation proceeds to step S4, and checks the flag for the unit. If the flag is "1", processing branches to step S5. When processing has branched to the step S5, the tuner section 11 and the monitor section 12 are powered on. At the aforementioned step S3, if the command is identified not to be a unit power-on command, processing proceeds to step S6 and determines whether the command is a tuner power-on command. If the command is the tuner power-on command, processing proceeds to step S7, and checks the tuner flag of the recording section 10. At step S4, if the flag for the unit is "0", processing proceeds to step S8 and checks the flag for the tuner of the recording section 10. At individual steps S7 and S8 if the flag for the tuner is determined as "1", processing branches to step S9 and powers on the tuner. At step S6 if the command is determined not to be a tuner power-on command, and at step S7 the flag for the tuner is determined to be "0", processing proceeds to step S10 and checks whether the command is a monitor power-on command. If the command is the monitor power-on command, processing proceeds to step S11, and checks whether the flag for the monitor of the recording section 10 is "1". If the flag is "1", in step S12 the monitor is powered on. If either step S10 or S11 determines the command is not a monitor power-on command or the flag for the monitor is not "1", processing terminates. While description is provided regarding the power-on, power-off is assumed to be performed in a similar manner: however, the power-off operations may be carried out according to the command.

When external power control is not desired at all, all values of flags in the determination-information recording section 10 in the controlled device 3B may be set to "0". Generally, these flag values are preset at the time of initialization setting. However, the setting method may be such that a function of setting is displayed using an on-screen display (OSD) with, for example, a TV-screen display or a display according to a display device such as a LED to enable the values to arbitrarily be set by a user.

The control processing configured as described above enables, for example, a determination of a device that should not be externally powered on and a determination as to whether power-on can be performed in units of the functional block. Particularly, the control can discretely be performed for a block such as a CRT of a TV when no user is in a room. As such, a significant advantage can be obtained in that the control contributes to improvement in safety and power saving of a TV, whose power consumption has increased according to an increase in the size of its CRT.

(Embodiment 3)

Figure 6:
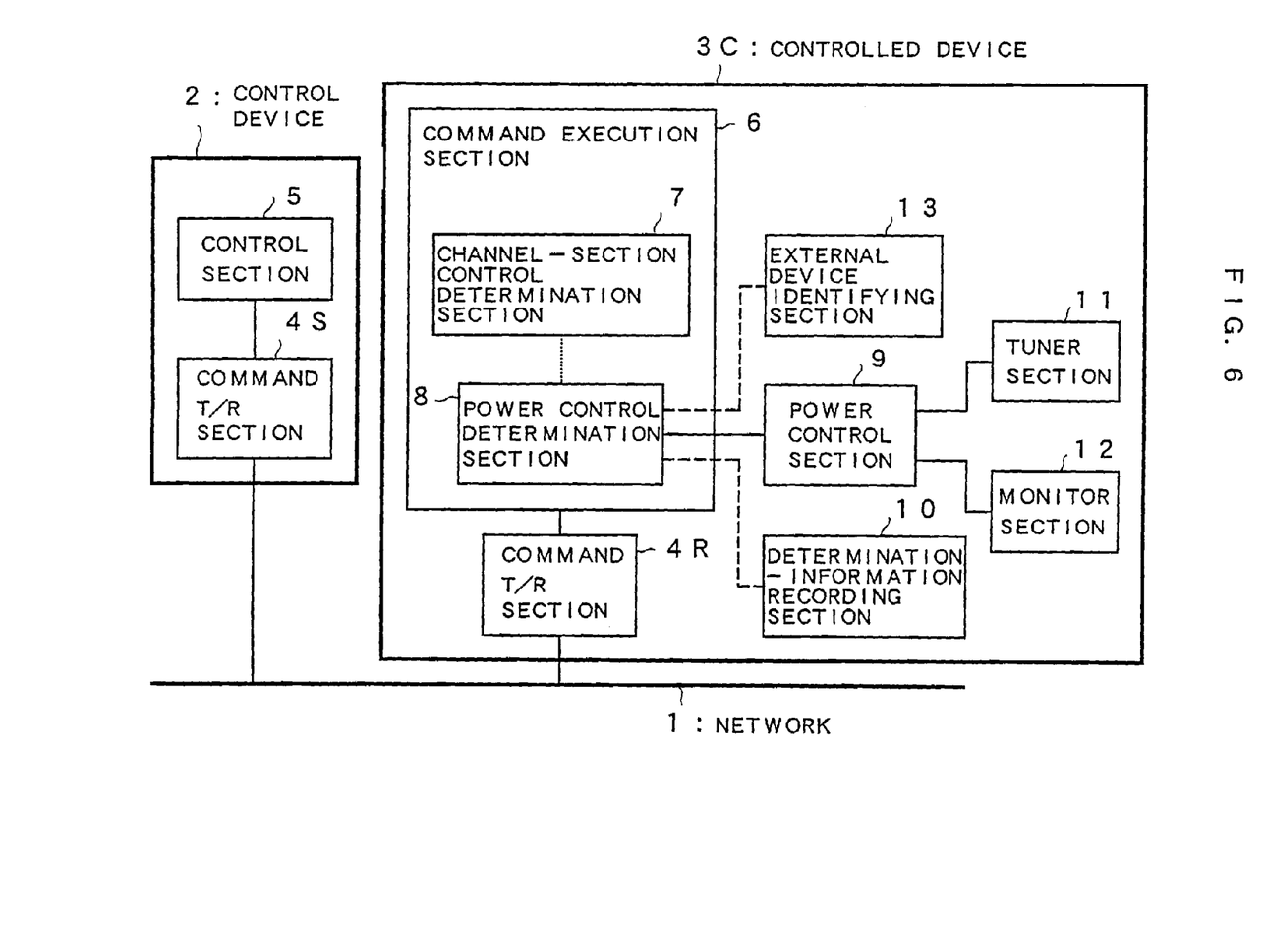
FIG. 6 is a system configuration view of a controlled device and a control device including a power controller in embodiment 3 of the present invention.

Hereinafter, a power controller according to embodiment 3 of the present invention will be described. FIG. 6 is a configuration view showing basic connection relationships among individual devices including a power controller according to the present embodiment. Also in the present embodiment, the same reference numerals are assigned to the same portions as those in the first and second embodiments, and the description thereof will be omitted. A controlled device 3C of the embodiment 3 is configured to include an external-device identifying section 13 in addition to the command transmission/reception section 4R, the command section 6 including the channel-selection control determination section 7 and the power-control determination section 8, the power control section 9, and the determination-information recording section 10. With a TV used for the controlled device 3C, the tuner section 11 and the monitor section 12 are provided.

The external-device identifying section 13 checks all controlled devices connected to the network 1, that is, audio/video devices, and detects the type and the function of each of the devices, thereby creating an information table described below. For the audio/video device connected to the IEEE 1394 network, a command for checking an element constituting the device is defined as an essential command.

For example, a SUBUNIT INFO command is used to check functions constituting a device. A UNIT INFO command is used to check representative functions of a device for determining the type thereof. The functions includes a monitor, a disk recorder/player, a tape recorder/player, a tuner, and a camera as constitution elements of the audio/video device; and a bulletin board (indicated as "BB" in the figure) called as "resource schedule board" which serves to disclose intradevice reserved information.

Figure 7:
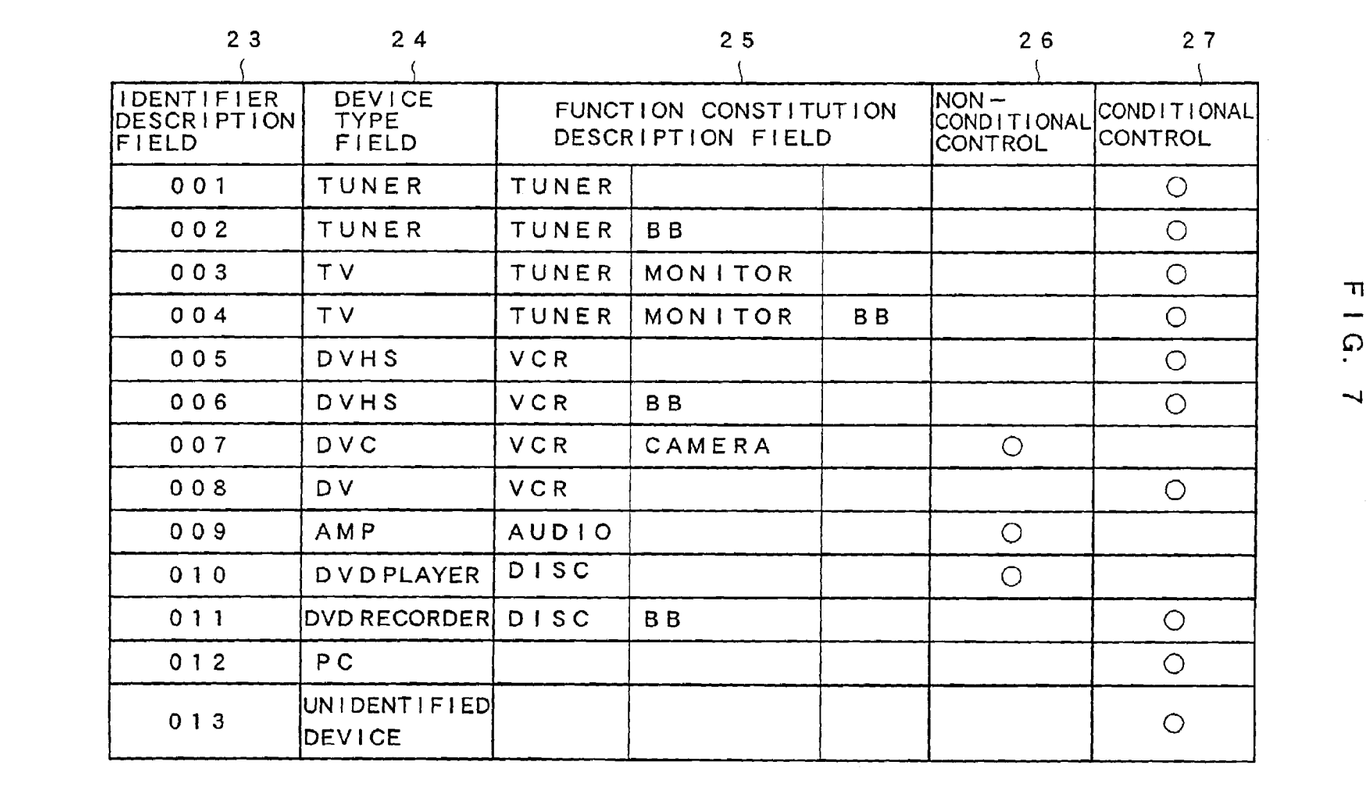
FIG. 7 is an explanatory view showing information preserved in an external-device identifying section in the power controller according to embodiment 3.

FIG. 7 shows an example of the information table showing functional configurations and control states of all the connected devices. The table contains an identifier description field 23, a device type field 24, and a function constitution description field 25. The information table is created using the UNIT INFO command and the SUBUNIT INFO command. For example, in many cases, a TV essentially requires a monitor and a tuner, and may be configured to include a reservation function. In the case of the TV including the above components, responses to the SUBUNIT INFO command are correspond to the monitor, tuner, and bulletin board; and a response to the UNIT INFO command corresponds to a monitor, and the type corresponds to a TV. When new devices are connected to the network, the external-device identifying section 13 retrieves detailed information of the devices as shown in FIG. 7 by using not only the UNIT INFO command and the SUBUNIT INFO command but also standardized commands for individual audio/video devices. For example, a TV with the identifier "003" includes a monitor and a tuner. Also, a TV with the identifier "004" includes a bulletin board in addition to a tuner and a monitor.

Further, control-condition description fields 26 and 27 are added into the aforementioned table. Registered in the non-condition control description field 26 are devices including a DVC with the identifier "007", an AMP with the identifier "009", and a DVD player with the identifier "010". In either of the devices with the identifiers "007" and "009", a device such as a monitor is not provided, in which control is unnecessary to be performed so as not to feed the power to a part of the functional blocks in opposition to control commands. In this case, control commands from the control device 2 are all accepted. On the other hand, registered in the conditional-control description field 27 are devices including tuners with the identifiers "001" and "002", TVs with the identifiers "003" and "004", and DVHSs with identifiers "005" and "006", and so on. Control is considered necessary to be performed for these devices so as not to feed the power to a part of functional blocks in opposition to control commands. As such, in the controlled device, even when a power control command to feed the power of a total device is received, power control is performed according to a rule registered in the determination-information recording section 10.

Preferably, identifiers according to Extended Unique Identifier64 (EUI64) of IEEE 1394 are used for device-specific identifiers. The types of the devices in the description field 24 and the functional configurations of the devices in the device-constitution description field 25 are each shown with a character string for the convenience of explanation. However, using SUBUNIT IDs in 1394TA documents enables greater memory savings.

The necessity of rechecking of a device once identified can be obviated by writing the above-described information to the nonvolatile memory such as an EEPROM. In the controlled device, when performing device identification of a tape recorder/player by using a device-specific command, a digital VHS, a DV, or the like can be identified from a data format which can be used by the device according to the use of an output-signal mode, a tape record format, and the like.

Figure 8:
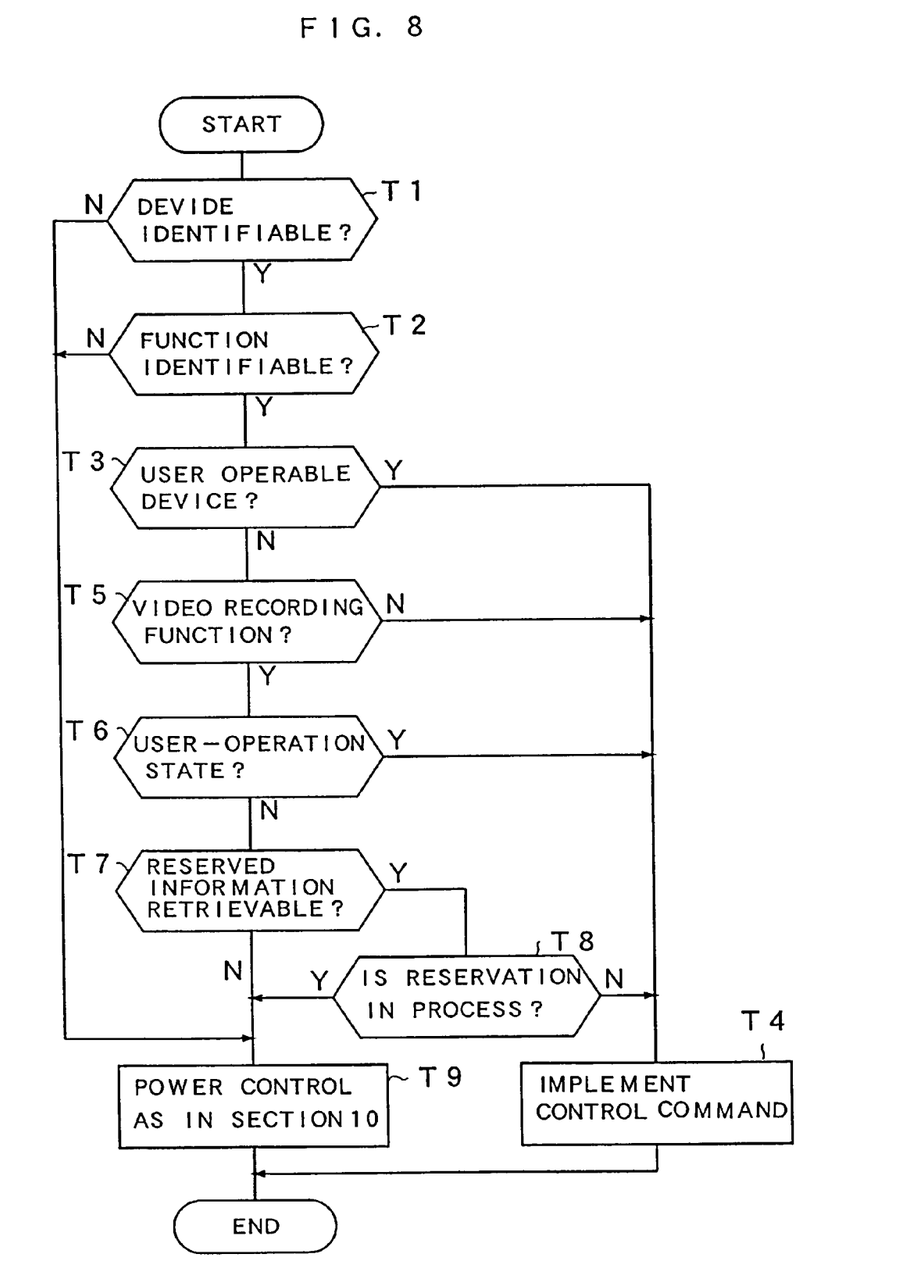
FIG. 8 is a flowchart showing an example procedure for performing power-on in the power controller according to embodiment 3.

Hereinafter, operation of the power controller configured as described will be described using a flowchart shown in FIG. 8. In the power control determination section 8 of the controlled device 3C shown in FIG. 6, upon receipt of a power-on control command has been received from a control device 2, the type of the control device 2 is retrieved from the external-device identifying section 13. At step T1, the power control section 9 shown in FIG. 6 checks as to whether the control device 2, which has transmitted the control command, can be identified for the device type.

At step T1, if the control device 2 is determined identifiable, the device type is identified. Then processing proceeds to step T2, and checks as to whether the functional configuration is identifiable in the step. This can be determined by referencing the description field 25 corresponding to the identifier shown in FIG. 7. At step T2 if the functional configuration is determined identifiable, processing proceeds to step T3, and performs checking at the step as to whether the device has involved a user operation in accordance with the unconditional-control description field 26 of the table in FIG. 7. As the DVC with the identifier "007" or the AMP with the identifier "009", if the checked device is determined to have involved a user operation, processing proceeds to step T4, and performs power control according to the control command at the step. Suppose, from the type of the control device, the control device 2 is apparently known to operate the controlled device 3C through a user operation as the DVC (digital video camera) with the identifier "007" and the DVD player with the identifier "010" which are shown in FIG. 7. In this case, the power-control determination section 8 does not use information retained by the determination-information recording section 10. In this instance, the power-control determination section 8 sends a power control command to the power control section 9 according to the power control command. Thereby, the user of the control device 2 determines that a person is present around the controlled device 3C, and performs power-on/power-off.

At step T3, if the device is determined not to have involved a user operation, processing proceeds to step T5, and checks thereat as to whether the device includes a video-recording function. This can be determined from the contents of the description field 25 shown in FIG. 7. If the device is determined not to include a video-recording function, processing proceeds to step T4, and performs power control of a specified functional block at the step. The power control can be performed according to the received command without referencing the contents of the determination-information recording section 10. If the device is determined to include a video-recording function, processing proceeds to step T6, and checks the device state thereat.

Figure 9:
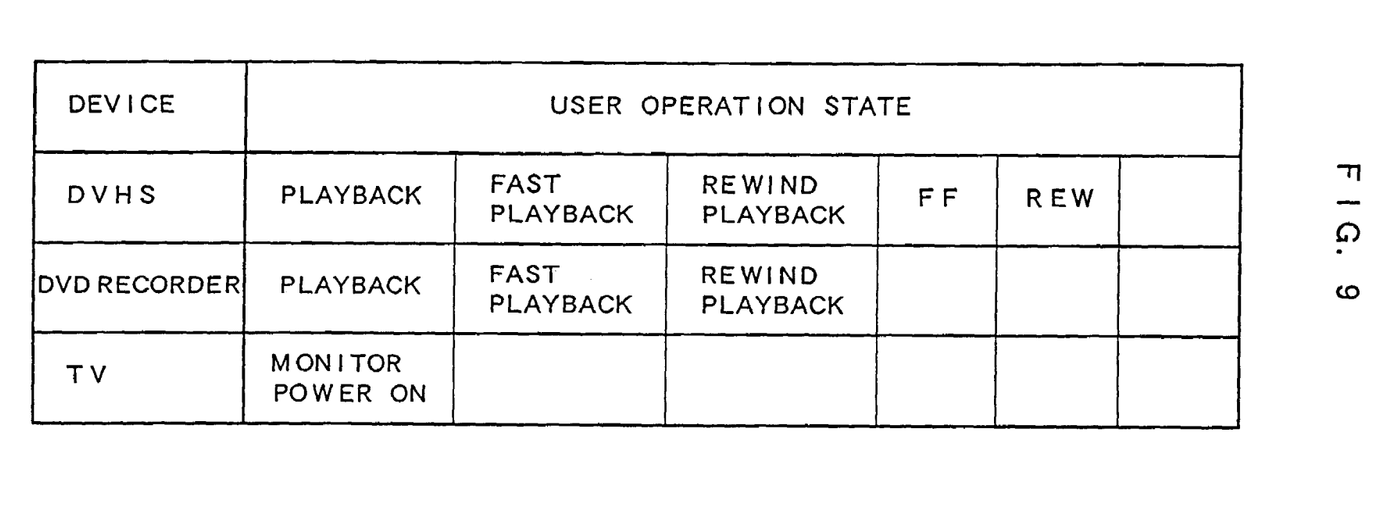
FIG. 9 is an explanatory view showing an example state of a connection destination device in the power controller according to embodiment 3.

An example device state is shown in FIG. 9. A user-operation state for a DVHS is one of, for example, playback, fast playback, rewind playback, fast forward, and rewind. Substantially similar to the DVHS, for a DVD player as a device, the state is one of playback, fast playback, and rewind playback, although the state is different depending on the device type. For a TV as a device, only a monitor power-on is set as the user-operation state.

At step T6 if the device state is determined to be a user-operation, processing proceeds to step T4; whereas, if the device state is determined not to be a user operation, processing proceeds to step T7. At step T7, processing checks as to whether reserved information is retrievable in a video-recording state. If the information is determined retrievable, processing proceeds to step T8, and if not, processing proceeds to step S9. At step T8 processing checks whether reservation is in process. If reservation is in execution, processing proceeds to step T9. On the other hand, at step T1 if the device is not identifiable, and at step T2 if the functional configuration is not identifiable, processing proceeds to step T9. At step T9, as in embodiment 2, power control is performed according to the information stored in the determination-information recording section 10 shown in FIG. 6 and the control command. If reservation is not in process, processing proceeds to step T4, and performs power control of a specified block in the step. The above operations enable the power control to be implemented in conformance to the type, function, and use state of the external device.

In the present embodiment, the power is controlled according to information stored in the determination-information recording section 10 at step T9. However, in order to secure safety, the configuration may be such that not all the power-on commands are executed for a device not having the determination-information recording section 10 when step T9 is reached.

It is to be understood that the present invention is not limited to any one of the embodiments, and various modifications and corrections may be imparted thereto within the scope of the claims of the invention.

As described above, according to the present invention, power control from an external device connected to a network can be implemented through determination made in accordance with setting information of an own local device and the function of a partner device. Particularly, for an audio/video device, power-on control can be implemented on the basis of the total device and in units of a functional block. Thereby, the power can be operated from the external device in consideration of safety and power saving.

INDUSTRIAL APPLICABILITY

According to the present invention, among a plurality of devices connected via a network, a power control command can be outputted in units of a functional block from one device (referred to as "control device") to another device (referred to as "controlled device"). In addition, a power controller can be realized that enables power-on/power-off to be implemented so as to achieve power saving corresponding to, for example, the type and the operation state of the controlled device.

What is claimed is:

1. A power controller for use in a local device having a plurality of functional blocks and that is connected to a bus connection network, the power controller performing power control in accordance with a power control command transmitted from an external device connected to the bus connection network, the power controller comprising:

a command transmitting/receiving section which receives the power control command from the external device and which transmits a response from the local device;

a power control section which independently performs power-on/power-off of one of the functional blocks of the local device; and a power-control determination section which performs a determination as to power-on/power-off of the functional blocks on the basis of a power control command supplied via said command transmitting/receiving section and which outputs a result of the determination for each of the functional blocks to said power control section.

2. The power controller according to claim 1, further comprising:

a determination-information recording section which preliminarily stores determination information of each of the functional blocks of the local device used to perform a determination as to whether to validate or invalidate a power control command transmitted from the external device, wherein said power-control determination section performs a determination as to whether to validate or invalidate execution of said power control command on the basis of information in said determination-information recording section upon receipt of the power control command from the external device, performs a determination as to individual block power-on/power-off only for a valid block on the basis of the power control command, and outputs a result of the determination to said power control section.

3. The power controller according to claim 2, wherein said determination-information recording section includes a flag which performs a determination as to whether to validate each of the functional blocks of the local device and a flag for performing a determination as to whether to validate or invalidate a control command in each of the functional blocks.

4. The power controller according to claim 1, further comprising:

a determination-information recording section which preliminarily stores determination information of each of the functional blocks of the local device used to perform a determination as to whether to validate or invalidate a power control command transmitted from the external device; and an external-device identifying section which identifies at least one of a type and a function of the external device connected to the bus connection network, wherein upon receipt of the power control command from the external device, in accordance with information of at least one of a type and a function of the external device identified by the external-device identifying section, said power-control determination section outputs the externally inputted power control command to said power control section as a valid command when the device has been determined to be able to permit an operation, determines the power control to each of the functional blocks corresponding to the power control command from the external device, and outputs a result of the decision to said power control section wherein the power control command is invalid on the basis of determination information received from said determination-information recording section when the device has been determined to be unable to permit an operation.

5. The power controller according to claim 4, wherein said external-device identifying section generates, an information table of each external device connected to the bus connection network, the information table has an area which stores a type and a function thereof, and a conditional-control area used to perform a determination as to whether or not to perform conditional control based on determination information in said determination-information recording section in response to a power control command inputted from the each external device.

6. The power controller according to claim 1, further comprising:
a determination-information recording section which preliminarily stores determination information of the functional blocks of the local device used to perform a determination as to whether to validate or invalidate a power control command transmitted from the external device; and
an external-device identifying section which identifies at least one of a type and a function of the external device connected to the bus connection network, wherein
upon receipt of the power control command from the external device, in accordance with information of at least one of a type and a function of the external device identified by said external-device identifying section, said power-control determination section outputs the externally inputted power control command to said power control section as a valid command when the device has been determined to be able to permit operation and has been determined to be in a user-operated state, and outputs determination information of each of the functional blocks corresponding to the power control command from the external device to said power control section, when the power control command is invalid, on the basis of determination information received from said determination-information recording section when the device has been determined to be unable to permit an operation and has been determined not to be in a user-operated state.

7. The power controller according to claim 6, wherein said external-device identifying section generates an information table of each external device connected to the bus connection network, the information table has an area which stores a type and a function thereof, and a conditional-control area used to perform a determination as to whether or not to perform conditional control based on determination information in said determination-information recording section in response to a power control command inputted from the each external device.

8. The power controller according to claim 1, further comprising:
a determination-information recording section which preliminarily stores determination information of the functional blocks of the local device used to perform a determination as to whether to validate or invalidate a power control command transmitted from the external device; and
an external-device identifying section which identifies at least one of a type and a function of the external device connected to the bus connection network, wherein
upon receipt of the power control command from the external device, in accordance with information of at least one of a type and a function of the external device identified by the external-device identifying section, said power-control determination section outputs the externally inputted power control command to said power control section as a valid command when the device has been determined to be able to permit an operation, has been determined to be in a user-operated state, and has been determined to be a reservation-recording state, and outputs determination information of each the functional blocks corresponding to the power control command from the external device to said power control section, in the case the power control command is invalid, on the basis of determination information received from said determination-information recording section when the device has been determined to be unable to permit an operation, has been determined not to be in a user-operated state, or has been determined not to be in a reservation-recording state.

9. The power controller according to claim 8, wherein said external-device identifying section generates an information table of each external device connected to the bus connection network, the information table has an area which stores a type and a function thereof, and a conditional-control area used to perform a determination as to whether or not to perform conditional control based on determination information in said determination-information recording section in response to a power control command inputted from the each external device.

10. A system for performing power control comprising:
an external device having a control section for issuing a power control command;
a local device having a plurality of functional blocks and a power controller for performing power control of each of the functional blocks;
a bus connection network connecting the external device and the local device;
wherein the power controller comprises a command transmitting/receiving section which receives the power control command from the external device and which transmits a response from the local device;
a power control section which independently performs power-on/power-off of one of the function blocks of the local device; and
a power-control determination section which performs a determination as to poweron/power-off of the functional blocks on the basis of a power control command supplied via said command transmitting/receiving section and which outputs a result of the determination for the functional blocks to said power control section.

11. The system for performing power control according to claim 10, wherein the power controller further comprises a determination-information recording section which preliminarily stores determination information of each of the functional blocks of the local device used to perform a determination as to whether to validate or invalidate a power control command transmitted from the external device, wherein said power-control determination section performs a determination as to whether to validate or invalidate execution of the power control command on the basis of information in said determination-information recording section upon receipt of the power control command from the external device, performs a determination as to individual block power-on/power-off only for a valid block on the basis of the power control command, and outputs a result of the determination to said power control section.

12. The system for performing power control according to claim 11, wherein said determination-information recording section includes a flag which performs a determination as to whether to validate each of the functional blocks of the local device and a flag for performing a determination as to whether to validate or invalidate a control command in each of the functional blocks.

13. The system for performing power control according to claim 10, wherein the power controller further comprises a determination-information recording section which preliminarily stores determination information of each of the functional blocks of the local device used to perform a determination as to whether to validate or invalidate a power control command transmitted from the external device; and an external-device identifying section which identifies at least one of a type and a function of the external device connected to the bus connection network, wherein upon receipt of the power control command from the external device, in accordance with information of at least one of a type and a function of the external device identified by the external-device identifying section, said power-control determination section outputs the externally inputted power control command to said power control section as a valid command when the device has been determined to be able to permit an operation, determines the power control to each of the functional blocks corresponding to the power control command from the external device, and outputs a result of the decision to said power control section wherein the power control command is invalid on the basis of determination information received from said determination-information recording section when the device has been determined to be unable to permit an operation.

14. The system for performing a power control power controller according to claim 13, wherein said external-device identifying section generates an information table of each external device connected to the bus connection network, the information table has an area which stores a type and a function thereof, and a conditional-control area used to perform a determination as to whether or not to perform conditional control based on determination information in said determination-information recording section in response to a power control command inputted from the each external device.

15. The system for performing a power control according to claim 10, wherein said power controller further comprises a determination-information recording section which preliminarily stores determination information of the functional blocks of the local device used to perform a determination as to whether to validate or invalidate a power control command transmitted from the external device; and an external-device identifying section which identifies at least one of a type and a function of the external device connected to the bus connection network, wherein upon receipt of the power control command from the external device, in accordance with information of at least one of a type and a function of the external device identified by said external-device identifying section, said power-control determination section outputs the externally inputted power control command to said power control section as a valid command when the device has been determined to be able to permit and operation and has been determined to be in a user-operated state, and outputs determination information of each of the functional blocks corresponding to the power control command from the external device to said power control section, when the power control command is invalid, on the basis of determination information received from said determination-information recording section when the device has been determined to be unable to permit an operation and has been determined not to be in a user-operated state.

16. The system for performing a power control according to claim 15, wherein said external-device identifying section generates an information table of each of the external device connected to the bus connection network, the information table has an area which stores a type and a function thereof, and a conditional-control area used to perform a determination as to whether or not to perform conditional control based on determination information in said determination-information recording section.

17. A system for performing a power control according to claim 10, wherein the power controller further comprises a determination-information recording section which preliminarily stores determination information of the functional blocks of the local device used to perform a determination as to whether to validate or invalidate a power control command transmitted from the external device; and an external-device identifying section which identifies at least one of a type and a function of the external device connected to the bus connection network, wherein upon receipt of the power control command from the external device, in accordance with information of at least one of a type and a function of the external device identified by said external-device identifying section, said power-control determination section outputs the externally inputted power control command to said power control section as a valid command when the device has been determined to be able to permit an operation, has been determined to be in a user-operated state, and has been determined to be a reservation-recording state, and outputs determination information of each of the functional blocks corresponding to the power control command from the external device to said power control section, when the power control command is invalid, on the basis of determination information received from said determination-information recording section when the device has been determined to be unable to permit an operation, has been determined not to be in a user-operated state, or has been determined not to be in a reservation-recording state.

18. The system for performing a power control according to claim 17, wherein said external-device identifying section generates an information table of each of the external device connected to the bus connection network, the information table has an area which stores a type and a function thereof, and a conditional-control area used to perform a determination as to whether or not to perform conditional control based on determination information in said determination-information recording section.

* * * * *